(12) United States Patent
Becker

(10) Patent No.: US 8,877,402 B2
(45) Date of Patent: Nov. 4, 2014

(54) METHOD FOR A FUEL CELL AIR SYSTEM LEAKAGE DIAGNOSTIC

(75) Inventor: Marc Becker, Idstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 133 days.

(21) Appl. No.: 13/614,495

(22) Filed: Sep. 13, 2012

(65) Prior Publication Data

US 2014/0072895 A1    Mar. 13, 2014

(51) Int. Cl.
*H01M 8/04*    (2006.01)

(52) U.S. Cl.
USPC ........................................... 429/444; 429/428

(58) Field of Classification Search
CPC ..................... H01M 8/04089; H01M 8/04126; H01M 8/04231; H01M 8/04753
See application file for complete search history.

(56) References Cited

U.S. PATENT DOCUMENTS

| 2004/0115495 A1* | 6/2004 | Asai et al. ........................ 429/22 |
| 2009/0068504 A1* | 3/2009 | Andersen et al. ................ 429/13 |
| 2011/0143241 A1* | 6/2011 | Tighe et al. ..................... 429/428 |

OTHER PUBLICATIONS

English machine translation of Suematsu JP2006-179469, Jul. 6, 2006.*

* cited by examiner

*Primary Examiner* — Ula C. Ruddock
*Assistant Examiner* — Lisa S Park Gehrke
(74) *Attorney, Agent, or Firm* — John A. Miller; Miller IP Group, PLC

(57) ABSTRACT

A system and method for identifying leaks in a cathode subsystem of a fuel cell system. An air flow meter is provided up-stream of a compressor and monitors the air flowing into the compressor. When an air leakage diagnostic is commanded, a fuel cell stack by-pass valve and back-pressure valve are closed so that no air flows through or around the stack, and the recirculation valve is opened so that the air flows around the compressor. By knowing the leakage through the by-pass valve and the back-pressure valve, any flow above those values measured by the air flow meter gives an indication of air leakage out of the cathode sub-system components.

20 Claims, 1 Drawing Sheet

METHOD FOR A FUEL CELL AIR SYSTEM LEAKAGE DIAGNOSTIC

BACKGROUND OF THE INVENTION

1. Field of the Invention

This invention relates generally to a system and method for identifying leaks in a cathode sub-system of a fuel cell system and, more particularly, to a system and method for identifying air leaks in a cathode sub-system of a fuel cell system that includes monitoring the air flow into a compressor when valves are positioned so that air flows only around the compressor.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

There are many components, devices and elements in a fuel cell system through which the reactant gases flow both upstream and downstream of the fuel cell stack. For example, in the cathode sub-system, the compressor provides air flow to the cathode side of the stack typically through a charge air cooler that cools the compressed air heated as a result of the compression and a water vapor transfer (WVT) unit that humidifies the cooled air, generally using the cathode exhaust, before the air is sent to the stack. The cathode sub-system also typically includes a by-pass valve for by-passing air around the stack and a back-pressure valve in the cathode exhaust line that controls the cathode side pressure. Any of these devices and components can develop leaks over time where air may be dumped overboard before it reaches the fuel cell stack, which reduces the amount of reactant air provided to the fuel cell stack, thus causing performance issues. In other words, the control algorithms for the fuel cell stack may command the compressor to a certain speed for a desired stack output current, but that amount of air may not reach the stack because air leaks occur through one or more of the components before the stack. Therefore, it would be desirable to be able to determine that a significant leak is occurring in the cathode sub-system as a diagnostic tool.

SUMMARY OF THE INVENTION

In accordance with the teachings of the present invention, a system and method are disclosed for identifying leaks in a cathode sub-system of a fuel cell system. The cathode sub-system includes a compressor that provides cathode air to the cathode side of a fuel cell stack at a desired flow rate and pressure. A recirculation line is provided around the compressor that includes a recirculation valve so that for certain operating conditions some or all of the compressor air can be directed around the compressor instead of flowing through the stack. The cathode sub-system also includes a by-pass valve that allows the cathode air to flow around the fuel cell stack and a back-pressure valve provided in a cathode exhaust line for controlling the pressure within the cathode side of the stack. An air flow meter is provided up-stream of the compressor and monitors the air flowing into the compressor. When the air leakage diagnostic is commanded, the by-pass valve and the back-pressure valve are closed so that no air flows through or around the stack, and the recirculation valve is opened so that the air flows around the compressor. By knowing the leakage through the by-pass valve and the back-pressure valve, any flow above those values measured by the air flow meter gives an indication of air leakage out of the cathode sub-system components.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining overboard leakage in a cathode sub-system of a fuel cell system is merely exemplary in nature, and is in no way intended to limit the invention or its applications or uses. For example, the present invention has particular application for a fuel cell system on a vehicle. However, as will be appreciated by those skilled in the art, the present invention has application for other fuel cell systems.

Figure 1:
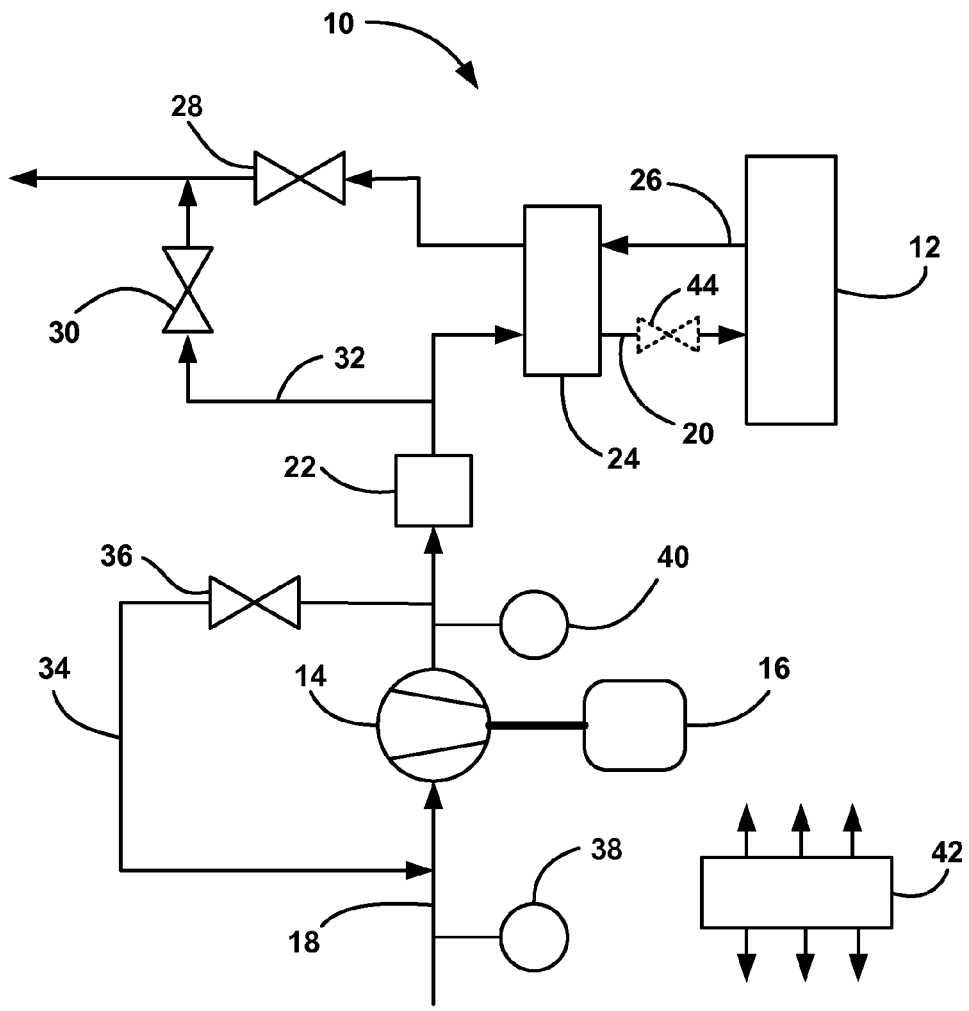
FIG. 1 is a schematic block diagram of a cathode sub-system of a fuel cell system.

FIG. 1 is a schematic block diagram of a cathode sub-system in a fuel cell system 10 that includes a fuel cell stack 12. The system 10 includes a compressor 14 that is operated by a motor 16 to draw in and compress air on line 18 to be provided to the cathode side of the fuel cell stack 12 on a cathode input line 20. The air from the compressor 14 is heated as a result of the compression process and therefore is cooled by a charge air cooler 22 in a process that is well understood by those skilled in the art. The charge air cooler 22 can be any heat exchanger suitable for this purpose, such as a liquid-gas heat exchanger. The cathode exhaust is output from the fuel cell stack 12 on a cathode exhaust gas line 26. The cooled air from the charge air cooler 22 is humidified in a WVT unit 24 to increase the relative humidity of the air to be more suitable for the fuel cell stack reaction process. The humidity and water vapor in the exhaust gas on the line 26 is used to provide the moisture to increase the relative humidity of the cathode input air in the WVT unit 24. A back-pressure valve 28 is provided in the exhaust gas line 26, and is a proportional valve whose position can be controlled to control the pressure within the cathode side of the fuel cell stack 12, including closing the line 26 to prevent flow through the cathode side of the stack 12. A by-pass valve 30 is provided in a by-pass line 32 so that the air can be selectively directed around the stack 12, where the valve 30 is also a proportional valve so that the amount of air flowing through the stack 12 and flowing around the stack 12 can be selectively controlled.

The system 10 also includes a recirculation line 34 around the compressor 14 having a recirculation valve 36. There may be certain operating conditions where the power demanded from the stack 12 is so low that the speed of the compressor 14 cannot be set low enough to only provide the necessary air, i.e., the compressor 14 has a minimum speed that provides more air than is desired. In this situation, the recirculation valve 36 is selectively controlled so that at least a portion of the air flows back to the input line 18 and not to the stack 12. Further, for low transient demands where the power output from the stack 12 is quickly reduced, the valve 36 may be controlled to prevent air from flowing to the stack 12 until the compressor 14 has had a chance to reduce its speed. An air flow meter 38 is provided in the input line 18 to measure the flow to the line 18 at a location that is upstream from the junction where the recirculated air is reintroduced back to the input of the compressor 14. A temperature sensor 40 measures the temperature of the air between the compressor 14 and the charge air cooler 22. The system 10 includes a controller 42 that controls the operation of the system 10 consistent with the discussion herein, including controlling the position of the valves 28, 30 and 36, setting the speed of the compressor 14, receiving an air flow measurement from the air flow meter 38, etc., and receiving any input and providing any control for determining the overboard leakage from the cathode sub-system as discussed herein.

The present invention proposes a technique for determining if any of the components in the cathode sub-system of the fuel cell system 10 is leaking enough air to significantly effect the operation of the system 10. These components include, but are not limited to, the charge air cooler 22, the WVT unit 24, valves, fittings, pipes, etc. As is well understood by those skilled in the art, models are known in the art that use the position of a valve as feedback to determine leakage through that particular valve. Therefore, leakage through the valves 28, 30 and 36 is not determined by the overboard leakage process described herein, where such models are used to determine that leakage, and that leakage is then subtracted from the flow, discussed in more detail below.

When the system control determines that an air overboard leakage diagnostic is to be performed, the valves 28 and 30 are closed so that there is no air flow through or around the stack 12. The valve 36 is opened so that all, or most, of the air that flows out of the compressor 14 is returned to the input of the compressor 14. The compressor 14 is set to a predetermined diagnostic speed, which would likely be at or near the minimum compressor speed. Some of the air will leak through the valves 28 and 30, which can be modeled for a particular compressor speed using position feedback, as discussed above. This minimal amount of air that is lost and is not recirculated back to the input of the compressor 14 is drawn in through the line 18 and allows a measurement by the air flow meter 38. Since this leakage is known, it can be subtracted from the air flow measurement, providing a zero value if no other leakage is occurring in the cathode sub-system.

If there is leakage through a component or device in the cathode sub-system other than the valves 28 and 30, then that leakage will also be measured by the air flow meter 38. Thus, once the calculated valve leakage is subtracted from the air flow meter measurement, the additional air flow that may be measured by the air flow meter 38 is an indication of the amount of leakage. If that leakage value exceeds some pre-defined threshold, indicating that the cathode sub-system has too large of a leak, a diagnostic can be set that indicates an overboard leakage is occurring and that the system 10 should be serviced. The temperature sensor 40 can measure the temperature during the diagnostic, and if a maximum temperature threshold is reached, the diagnostic can be aborted. However, if the speed of the compressor 14 is set at or near a minimal speed, then the amount of heating of the cathode air should not be significant.

In certain fuel cell systems, the compressor 14 may be of the type that can be run at a slow enough speed to provide the minimum flow rate under all applicable system operating conditions so that the recirculation valve 36 and the recirculation line 34 can be eliminated. For this type of system, the back-pressure valve 28 may need to be opened at least slightly to overcome compressor surge concerns. In this system, leak detection can be performed by modeling the low flow through the slightly open back-pressure valve 28, and subtracting that flow value from the flow measured through the air flow meter 38.

It is noted that in certain fuel cell systems, the back-pressure valve 28 can be replaced with a cathode inlet valve 44, and a leak through the valve 44 can be determined consistent with the discussion herein. It is further noted that the valves 28, 30, 36 and 44 can be either proportional valves or discrete valves depending on the particular system.

The diagnostic for determining cathode sub-system overboard leakage can be performed at any suitable time and at any suitable rate. For example, the diagnostic may be performed at system shut-down once every fifty shut down operations. Also, there are various operating modes where the stack 12 may not be producing power to operate the vehicle, such as a stand-by mode when the vehicle is at a stop light. The diagnostic discussed above may be performed during those operating conditions where no stack power is required.

Figure 2:
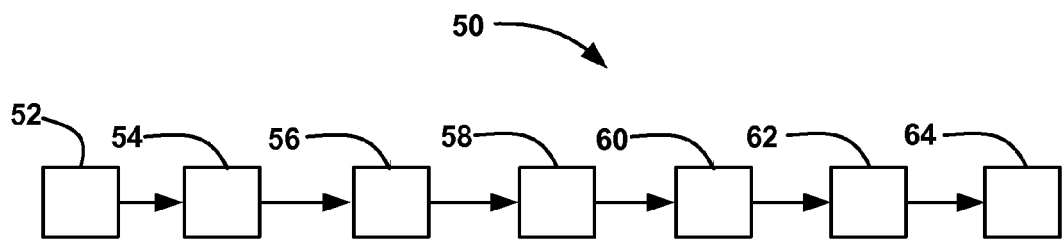
FIG. 2 is a flow chart diagram showing a process for determining leaks in the cathode sub-system shown in FIG. 1.

FIG. 2 is a flow chart diagram 50 showing the process discussed above for the overboard leakage diagnostic. The diagnostic is initiated at box 52 and the compressor 14 is set to the desired compressor speed at box 54. The valves are then set at box 56, where the valves 28 and 30 are closed and the valve 36 is opened. The air flow measurement is determined at box 58 and the valves leakage model value is obtained and subtracted from the measurement at box 60. The modified measurement value is then compared to a threshold at box 62 and a diagnostic is set at box 64 if the modified measurement value exceeds the threshold.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining overboard leakage of cathode air that is provided to a cathode side of a fuel cell stack in a fuel cell system, said method comprising:
    setting a compressor that provides the cathode air to the stack to a predetermined compressor speed;
    closing a back-pressure valve positioned within a cathode exhaust line to prevent cathode air flow through the fuel cell stack;
    closing a by-pass valve to prevent air flow around the fuel cell stack;
    opening a recirculation valve to allow the cathode air to flow around the compressor and be sent back to a compressor input;
    measuring a flow of air into the compressor upstream of a location where the recirculated cathode air is sent to the compressor; and
    determining whether the measured air flow indicates leakage of the cathode air from the system.

2. The method according to claim 1 further comprising modeling a leakage of the back-pressure valve and the by-pass valve, and subtracting the valve leakage from the measured air flow to give a modified flow value that is used to determine leakage of the cathode air.

3. The method according to claim 1 further comprising measuring a temperature of the cathode air from the compressor and aborting the step of determining whether the measured air flow indicates leakage if the measured temperature exceeds the predetermined temperature threshold.

4. The method according to claim 1 wherein the method at least determines overboard leakage through a charge air cooler and a water vapor transfer unit in the fuel cell system.

5. A method for determining overboard leakage of cathode air that is provided to a cathode side of a fuel cell stack in a fuel cell system, said method comprising:
    setting a compressor that provides the cathode air to the stack to a predetermined compressor speed;
    controlling one or more valves to prevent or allow air flow through or around the fuel cell stack;
    measuring a flow of air into the compressor;
    modeling leakage through the one or more valves that prevent or allow the air to flow through or around the fuel cell stack;
    subtracting the leakage of air through the one or more valves from the measured flow of air to get a modified air flow value; and
    determining whether the modified air flow value indicates leakage of the cathode air from the system.

6. The method according to claim 5 further comprising allowing the air to flow around the compressor and be sent back to a compressor input, wherein measuring a flow of air into the compressor includes measuring the flow of air into the compressor upstream of a location where the air flow around the compressor is sent back to the compressor input.

7. The method according to claim 6 wherein controlling one or more valves includes opening a recirculation valve to allow the cathode air to flow around the compressor and be sent back to a compressor input.

8. The method according to claim 5 wherein controlling one or more valves includes slightly opening a back-pressure valve positioned within a cathode exhaust line to allow cathode air flow through the fuel cell stack.

9. The method according to claim 5 wherein controlling one or more valves includes controlling a back-pressure valve that is positioned within a cathode exhaust line to prevent cathode air flow through the fuel cell stack.

10. The method according to claim 5 wherein controlling one or more valves includes controlling a by-pass valve to prevent air flow around the fuel cell stack.

11. The method according to claim 5 further comprising measuring a temperature of the cathode air from the compressor and aborting the step of determining whether the measured air flow indicates leakage if the measured temperature exceeds the predetermined temperature threshold.

12. The method according to claim 5 wherein the method at least determines overboard leakage through a charge air cooler and a water vapor transfer unit in the fuel cell system.

13. A system for determining overboard leakage of cathode air that is provided to a cathode side of a fuel cell stack in a fuel cell system, said system comprising:
    means for setting a compressor that provides the cathode air to the stack to a predetermined compressor speed;
    means for controlling one or more valves to prevent or allow air flow through or around the fuel cell stack;
    means for measuring a flow of air into the compressor; and
    means for determining whether the measured air flow indicates leakage of the cathode air from the system.

14. The system according to claim 13 further comprising means for allowing the air to flow around the compressor and be sent back to a compressor input, wherein the means for measuring a flow of air into the compressor measures the flow of air into the compressor upstream of a location where the air flow around the compressor is sent back to the compressor input.

15. The system according to claim 14 wherein the means for controlling one or more valves opens a recirculation valve to allow the cathode air to flow around the compressor and be sent back to a compressor input.

16. The system according to claim 13 wherein the means for controlling one or more valves slightly opens a back-pressure valve positioned within a cathode exhaust line to allow cathode air flow through the fuel cell stack.

17. The system according to claim 13 further comprising means for modeling a leakage of the one or more valves, and subtracting the valve leakage from the measured air flow to give a modified flow value that is used to determine leakage of the cathode air.

18. The system according to claim 13 wherein the means for controlling one or more valves controls a back-pressure valve that is positioned within a cathode exhaust line to prevent cathode air flow through the fuel cell stack and a by-pass valve to prevent air flow around the fuel cell stack.

19. The system according to claim 13 further comprising means for measuring a temperature of the cathode air from the compressor and aborting the step of determining whether the measured air flow indicates leakage if the measured temperature exceeds the predetermined temperature threshold.

20. The system according to claim 13 wherein the system at least determines overboard leakage through a charge air cooler and a water vapor transfer unit in the fuel cell system.

* * * * *